(Specimens.)

M. AMS.
PRESERVING FISH OR MEATS.

No. 423,545. Patented Mar. 18, 1890.

WITNESSES
Wm. A. Lowe
Wm. Wagner

INVENTOR
Max Ams
by his attorneys
Roeder & Briesen

UNITED STATES PATENT OFFICE.

MAX AMS, OF NEW YORK, N. Y.

PRESERVING FISH OR MEAT.

SPECIFICATION forming part of Letters Patent No. 423,545, dated March 18, 1890.

Application filed September 16, 1889. Serial No. 324,014. (Specimens.)

*To all whom it may concern:*

Be it known that I, MAX AMS, of New York city, New York, have invented an Improved Process of Preserving Fish or Meat, of which the following is a specification.

This invention has for its object to produce a superior grade of smoked sturgeon or other fish or of smoked meat.

Heretofore it has been found impracticable to can such smoked meat or fish, for the reason, principally, that the same would not remain juicy, and for the additional reason that the irregular chunks of the fish or meat would require a very large amount of oil, meat juice, or other liquid to fill the interstices within the can.

My improved process produces, first, a juicy fish or meat, and, secondly, one compressed into such a form during the smoking process that it will snugly fill the can.

In carrying out my process I make use, preferably, of an apparatus which forms the subject of a separate application for a patent filed by me on even date herewith, Patent No. 418,666, and which I have also illustrated in this patent, so that my process may be more readily understood.

Figure 4:
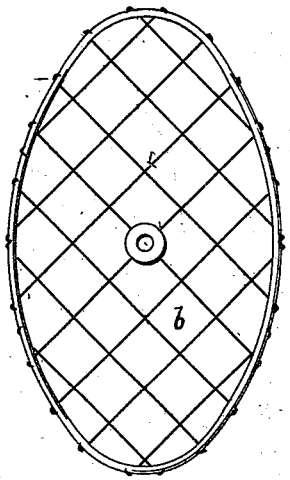
Figure 3:
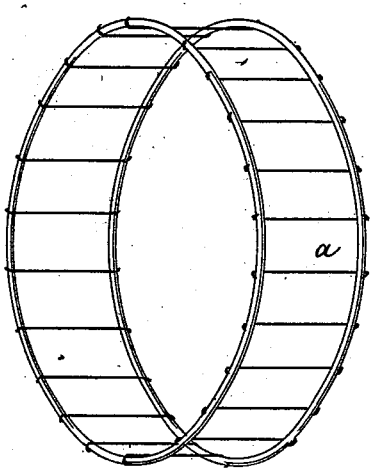
Figure 5:
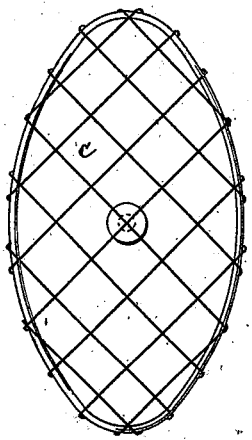
Figure 1:
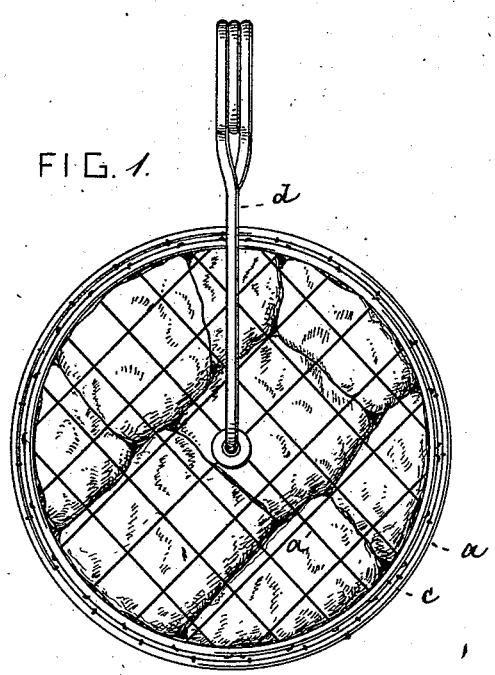
Figure 2:
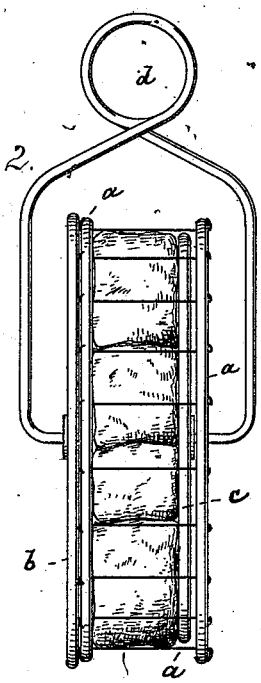
Figure 6:
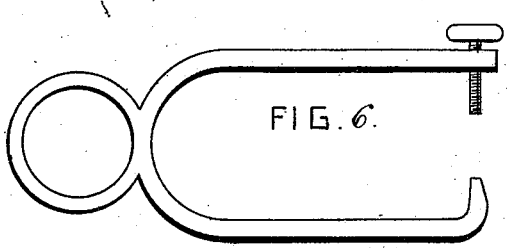

In the drawings, Figure 1 represents a side elevation of such apparatus; Fig. 2, an end view thereof; Fig. 3, a perspective view of the drum without the heads, and Figs. 4 and 5 perspective views of the two heads. Fig. 6 is an elevation of a modification of the suspending clasp.

The receptacle that I employ for carrying out my process must be open, so that free access is given to the smoke. Moreover, one side, head, or part must be of such a size that it enters the receptacle and can be pressed farther and farther into the same. I prefer to employ a vessel of a drum shape and of a cross-section equal to the cross-section of the can wherein the product is to be packed.

In the apparatus shown in the drawings, *a* is the open-work drum, *b* is a fixed or outer head, *c* the movable or inner head, and *d* the spring-clasp for forcing the head *c* inward.

In Fig. 6 a screw-clasp is illustrated that may be used in place of the spring-clasp.

In carrying out the process the sturgeon or other fish or the meat is cut up into suitable pieces, is salted in brine for the proper length of time, and is then placed into the drum. So many pieces of the fish or meat should be packed into one drum as will nicely fill it. The drum with the heads and clasp properly in place is next suspended in the smoking-room. While subjected to the action of the smoke, and as the fish or meat becomes more and more compact or set, the inner or movable cover will gradually press it against the fixed or outer cover, so that the product will take the shape of a disk with comparatively speaking flat sides. While the mass is being thus smoked and compressed the receptacle containing the fish or meat should be turned from time to time, so that the juice that settles at the bottom is again brought to the top, and is compelled to flow through the mass again. Thus the juice is retained in the product. After the smoking process is completed the product is packed in cans of substantially the same diameter as the drum.

Of course the cans may be higher than the disk of meat introduced therein, in which case two, three, or more of such disks are superposed until the can is filled.

What I claim is—

1. The process of preserving fish or meat, which consists, first, in cutting the fish or meat into pieces; second, salting the same in brine; third, placing it in an open-work receptacle, and, fourth, compressing the same mechanically and simultaneously subjecting it to the action of smoke, substantially as specified.

2. The process of preserving fish or meat, which consists, first, in cutting the fish or meat into pieces; second, salting the pieces thus cut in brine; third, placing the meat in an open-work receptacle; fourth, compressing the meat mechanically and simultaneously subjecting it to the action of smoke, and finally turning the receptacle and its contents from time to time during the smoking, whereby the juices are made to pass through the mass, substantially as specified.

3. The process of preserving fish or meat, which consists in compressing the same mechanically into disk form between a pair of plates while the fish or meat is subjected to the action of smoke, then packing it into cans, and finally hermetically sealing the cans, substantially as specified.

4. The process of preserving fish or meat, which consists in salting it, simultaneously smoking and compressing it into disk form, and then packing it into cans and hermetically sealing the cans, substantially as specified.

MAX AMS.

Witnesses:
F. v. BRIESEN,
WM. WAGNER.